(12) United States Patent
Shinohara

(10) Patent No.: US 6,711,364 B2
(45) Date of Patent: Mar. 23, 2004

(54) COLOR IMAGE FORMING APPARATUS

(75) Inventor: Tadashi Shinohara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/247,699

(22) Filed: Sep. 20, 2002

(65) Prior Publication Data

US 2003/0063917 A1 Apr. 3, 2003

(30) Foreign Application Priority Data

Sep. 21, 2001 (JP) .................................. 2001-288517

(51) Int. Cl.⁷ .................. G03G 15/01; G03G 15/00
(52) U.S. Cl. .................. 399/49; 250/559.44; 347/116; 399/301
(58) Field of Search ................. 399/49, 249, 301; 347/116; 101/181, 248; 250/559.44

(56) References Cited

U.S. PATENT DOCUMENTS

| | | | |
|---|---|---|---|
| 5,621,221 A | 4/1997 | Shinohara et al. |
| 5,737,665 A | 4/1998 | Sugiyama et al. |
| 5,765,083 A | 6/1998 | Shinohara |
| 5,828,937 A | 10/1998 | Aerens et al. |
| 5,875,380 A | 2/1999 | Iwata et al. |
| 5,889,534 A | 3/1999 | Johnson et al. |
| 5,899,597 A | 5/1999 | Shinohara et al. |
| 5,962,783 A | 10/1999 | Iwata et al. |
| 5,963,240 A | 10/1999 | Shinohara et al. |
| 6,118,557 A | 9/2000 | Sugiyama et al. |
| 6,128,459 A | 10/2000 | Iwata et al. |
| 6,218,660 B1 | 4/2001 | Hada |
| 6,282,396 B1 | 8/2001 | Iwata et al. |
| 6,295,435 B1 | 9/2001 | Shinohara et al. |
| 6,380,960 B1 | 4/2002 | Shinohara |
| 6,381,435 B2 | 4/2002 | Shinohara et al. |

FOREIGN PATENT DOCUMENTS

| | | |
|---|---|---|
| EP | 1 094 663 A1 | 4/2001 |
| JP | 63-286864 | 11/1988 |
| JP | 7-140752 * | 6/1995 |
| JP | 8-50385 | 2/1996 |

* cited by examiner

*Primary Examiner*—Joan Pendegrass
(74) *Attorney, Agent, or Firm*—Oblon, Spivak, McClelland, Maier & Neustadt, P.C.

(57) ABSTRACT

Compensation patterns are formed on a conveyer belt. Sensors detect the compensation patterns and output a signal. A frequency component that is above the frequency that corresponds to the compensation patters is cut off by a filter. The positions of the compensation patters are determined based on the output of the filter. The filter is, for example, an IIR type digital filter. A correction value is calculated based on the determined positions of the compensation patters. A driver is controlled based on the correction value. As a result, images of different colors can be matched accurately.

10 Claims, 11 Drawing Sheets

COLOR IMAGE FORMING APPARATUS

BACKGROUND OF THE INVENTION

1) Field of the Invention

The present invention relates to a color image forming apparatus for creating full-color images for use in an electrostatic-type copying machine, printer, facsimile device and the like. Particularly, the present invention relates to a color image forming apparatus that creates a color image on a recording medium by super imposing full-color toner images created by full-color image processing sections arranged along a conveyer belt.

2) Description of the Related Art

There have been color image forming apparatuses that create color images on a recording medium by superimposing a full-color toner image created by full-color image processing sections arranged along a conveyer belt. A typical example of such an apparatus is a full-color image forming apparatus of the tandem type.

In the color image forming apparatus of the tandem type, the alignment of the respective colors is important. The factors that affect positional deviation of colors are skew, positional deviation of the resist in the sub-scanning direction and the main scanning direction, unevenness of pitch in the sub-scanning direction, and magnification rate error in the main scanning direction. There have been many inventions made previously to correct the positional deviation of colors. For example, a technology for detecting the positions of a plurality of markers, also called as compensation patterns, formed on the conveyer belt is described in Japanese Patent Laid-Open Publication No. H08-50385 (Patent No. 2858735). This publication discloses a technology that automatically corrects the positional deviation of the basic colors with respect to the other colors in the main scanning direction and sub-scanning direction.

Further, a technology for automatically correcting the positional deviation of colors in the main scanning direction is described in Japanese Patent Laid-Open Publication No. S63-286864 (Patent No. 2642351). It has been disclosed in this publication to carry out the automatic correction by forming transverse lines or compensation pattern on the conveyer belt in the main scanning direction. This is followed by calculating the positional deviation of the oblique lines in the main scanning direction by comparing the ideal gap between the reference line and the oblique line with the actual detected gap. The main scanning write clock or read clock is then corrected based on the result. The color image forming apparatus of the tandem type detects the compensation pattern formed on the conveyer belt and automatically corrects the positional deviation based on the result of detection of the compensation patterns. However, the automatic correction process does not completely eliminate the positional deviation of all the colors. This is because the detection of the compensation pattern is not always accurate.

SUMMARY OF THE INVENTION

It is an object of this invention to provide a color image forming apparatus that can accurately match the position of each color when forming a color image on a recording medium.

The image forming apparatus according to one aspect of the present invention comprises a plurality of full-color image processing sections arranged along a conveyer belt, each of the image processing sections forming a toner image of a corresponding color on a recording medium in a superimposed fashion; a driver that drives the image processing sections; a compensation pattern forming unit that forms at least one compensation pattern on the conveyer belt; at least one sensor that detects the compensation pattern and outputs a signal when the compensation pattern is detected; a filter that filters out frequency components from the signal output by the sensor that do not correspond to frequency component of the compensation pattern, and outputs the remaining frequency component; a compensation pattern position recognizer that recognizes the position of the compensation pattern on the conveyer belt based on the output of the filter; a correction value calculator that calculates a correction value based on position of the compensation pattern recognized by the compensation pattern position recognizer; and a drive controller that controls the driver based on the correction value when forming a color image on the recording medium.

These and other objects, features and advantages of the present invention are specifically set forth in or will become apparent from the following detailed descriptions of the invention when read in conjunction with the accompanying drawings.

DETAILED DESCRIPTIONS

A first embodiment of the present invention is explained with reference to FIG. 1 to FIG. 14. The first embodiment is an example of an image forming apparatus of tandem type.

Figure 1:
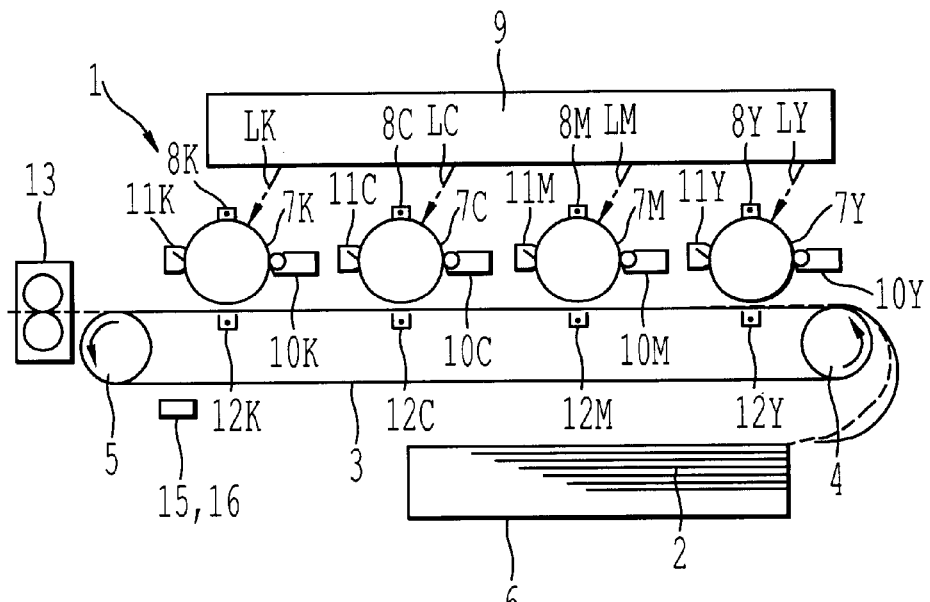
FIG. 1 is an elevation view of image processing sections and a conveyer belt, and illustrates the fundamentals of a color image forming apparatus of a first embodiment of the present invention.

FIG. 1 is an elevation view of image processing sections and a conveyer belt. This figure illustrates the fundamentals of a color image forming apparatus of the first embodiment. Reference numeral 1 denotes a plurality of color image processing sections for forming the image in respective colors of yellow Y, magenta M, cyan C and black K. The color image processing sections 1 are arranged in a row along a conveyer belt 3 for conveying a transfer sheet 2. The conveyer belt 3 is suspended on a rotating driving roller 4 and a conveying roller 5. The driving roller 4 is used for driving the conveyer belt 3. The conveyer belt 3 is driven in a rotating motion by the driving roller 4 in the direction shown by the arrows. A paper-feeding tray 6 containing a pile of transfer sheets 2 is provided below the conveyer belt 3. The top-most transfer sheet 2 is fed at the time of forming the image. The transfer sheet 2 electrostatically adheres to the conveyer belt 3. The transfer sheet 2 is then conveyed to the first yellow image processing section 1 and the yellow image formation is performed. The first yellow image processing section 1 consists of a photosensitive drum 7Y, a charger 8Y, a developing unit 10Y, a photosensitive cleaner 11Y, and a recording unit 12Y. An exposing device 9 emits yellow laser beam LY for forming a yellow image. A latent image is formed on the surface of the photosensitive drum 7Y when the surface of the photosensitive drum 7Y is charged by the charger 8Y. The developing unit 10 develops the latent image. As a result, a toner image is formed on the photosensitive drum 7Y. The recording unit 12Y transfers the toner image to the transfer sheet 2 and thus a yellow image is formed on the transfer sheet 2. The photosensitive cleaner 11Y then removes the residual toner remaining on the surface of the photosensitive drum 7Y and prepares the photosensitive drum 7Y for the next image formation.

Thus the transfer sheet 2 with the yellow image formed by the first image processing section of yellow color is conveyed to the second image processing section of magenta color by the conveyer belt 3. A toner image of magenta color that is formed on the photosensitive drum 7M is superposed on the transfer sheet 2. The transfer sheet 2 is further conveyed to the third image processing section of cyan color and the fourth image processing section of black color. The toner images formed in the same manner are transferred. The transfer sheet 2 passing from the second image processing section to the fourth image processing section in the order of magenta, cyan, black color goes through the same steps as it does in the first image processing section 1 of yellow color and hence the explanation is omitted. The transfer sheet 2, passing through the fourth image processing section 1 and having the color image formed thereon, is peeled off from the conveyer belt 3. A fixing unit 13 fixes the color image to the transfer sheet 2 after which the transfer sheet 2 is released.

Figure 2:
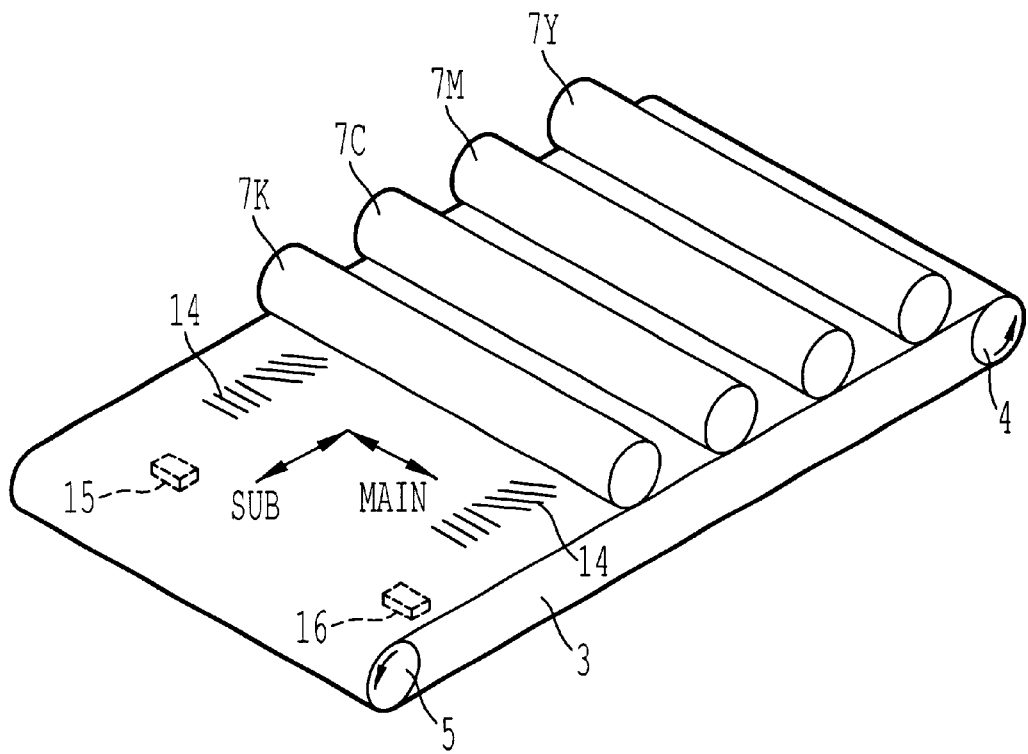
FIG. 2 is an oblique view of the conveyer belt on which compensation patterns are formed.

FIG. 2 is an oblique view of a conveyer belt on which compensation patterns are formed. In the image forming apparatus of tandem type shown in FIG. 1, the alignment of the respective colors is important. The factors affecting positional deviation of colors are, skew, positional deviation of the resist in the sub-scanning and main scanning direction, unevenness of pitch in the sub-scanning direction, and magnification rate error in the main scanning direction.

In the color image forming apparatus of the first embodiment, the positional deviation of colors is corrected before the actual color image is formed on the transfer sheet 2. As shown in FIG. 2, the compensation patterns 14 are formed on conveyer belt 3 to correct the positional deviation of each color. The compensation patterns 14 are detected by the sensors 15 and 16. The two sensors 15 and 16 are disposed on either side of the belt 3 in the main scanning direction. The compensation patterns 14 are formed on the conveyer belt 3 at such positions that they can be detected by the sensors 15 and 16. The compensation patterns 14 are detected when the conveyer belt 3 rotates and thereby taking along the compensation patterns 14 formed on the conveyer belt 3 over the sensors in sequence.

In the color image forming apparatus, the amount of correction and the amount of deviation of each color is calculated from the result of detection of the compensation patterns 14, and a correction for the deviation of each color is carried out as follows.

Figure 3:
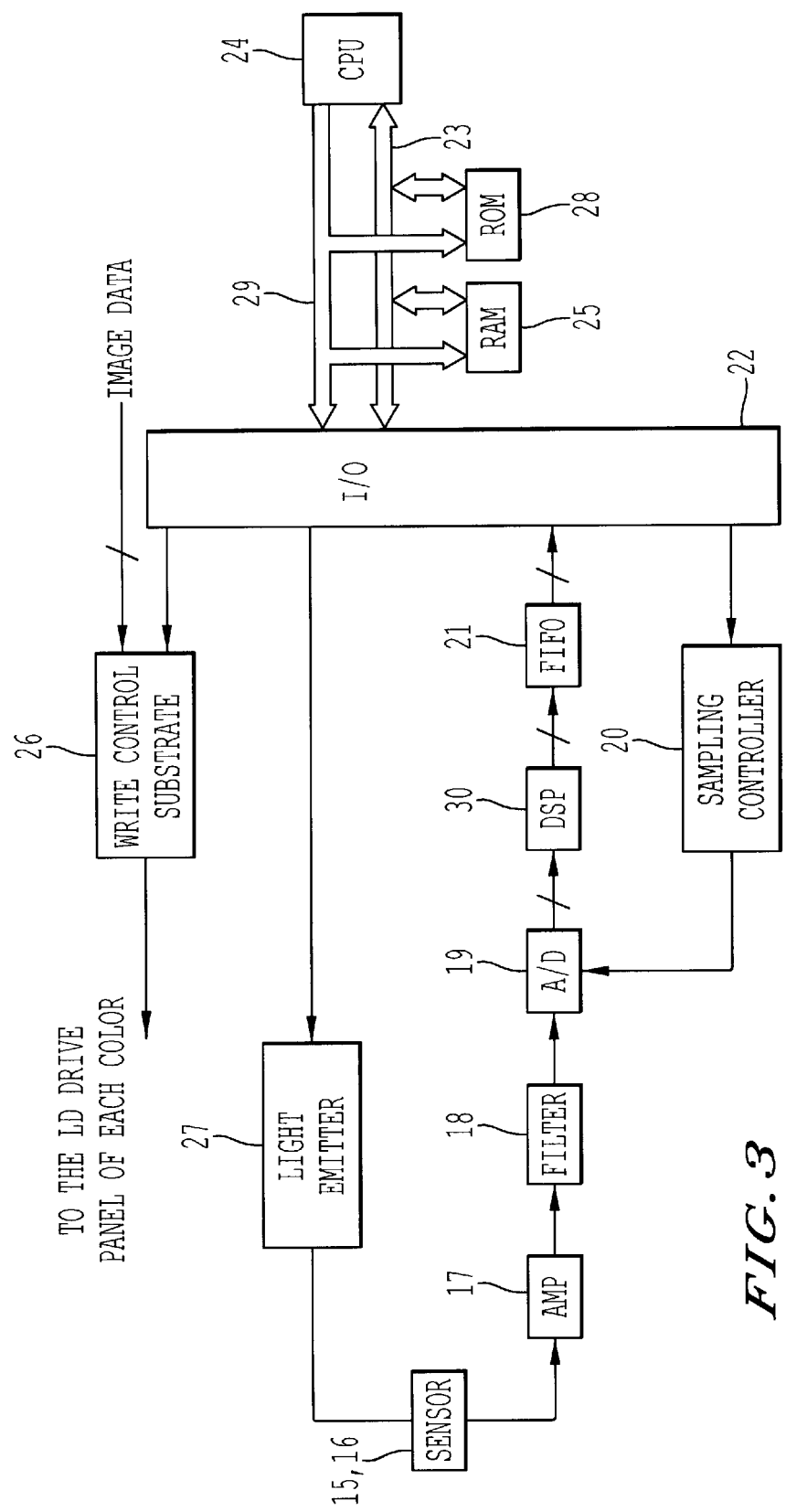
FIG. 3 is a block diagram of the color image forming apparatus of the first embodiment.

FIG. 3 is a block diagram of the color image forming apparatus according to the first embodiment. The process of correction of the data obtained by the sensors 15 and 16 is explained with reference to FIG. 3. The signal obtained by the sensors 15 and 16 is amplified by an amplifier (AMP) 17. A filter 18 filters out all frequencies except those that match the compensation patterns 14. The filtered signal is converted from analog data to digital data by an A/D converter 19. The sampling of data in is the A/D converter 19 is controlled by a sampling controller 20. The sampling rate of the data for this embodiment is 20 KHz. The data after sampling is fed to the digital signal processor (DSP) 30. A fast filter calculation with steep attenuation is performed in real time in the DSP 30. The data obtained by the calculation is stored in the FIFO memory 21. The data stored in the FIFO memory 21 is loaded from a data bus 23 to a CPU 24 and a RAM 25 through an I/O port 22 after the compensation patterns 14 are detected. The CPU 24 then calculates the value of positional deviation of the respective colors.

The CPU 24 performs skew correction, alters the resist in main scanning and sub-scanning direction, and the magnification error based on the determined value of positional deviation. The CPU 24 performs its functions by driving a not shown stepping motor and carrying out the necessary setting in the write control substrate 26. The stepping motor drives the conveyer belt 3. The write control substrate 26 controls the resist in the main scanning direction and sub-scanning direction. The write control substrate 26 is provided with a clock generator for each color. The clock generator employs a voltage controlled oscillator (VCO) that is capable of fine-adjusting the output frequency. The output of the VCO is used as an image clock signal.

The CPU 24 monitors the signal detected by the sensors 15 and 16 at appropriate timing. The CPU 24 controls the amount of light emitted by a light emitter 27 such that even though deterioration and the like of the conveyer belt and sensors 15 and 16 occurs, the compensation patterns 14 are detected. The amount of light received by the light receptors of the sensors 15 and 16 can be controlled to be always constant, by controlling the amount of light emitted.

The computer programs including the computer program for calculating deviations are stored in the ROM 28. The different types of I/O equipment, ROM address, RAM address, etc. are specified using an address bus 29.

How the positional deviation is calculated and how it is corrected will be described next. The calculations are based on the detection result of the compensation patterns 14.

How the skew is corrected will be explained first. The correction of skew is carried out by tilting the mirror that is not shown in the diagram. The mirror is provided inside the exposing device 9 for deflecting the laser beam of each color. The tilt of the mirror is changed by controlling a stepping motor that rotates the mirror.

Figure 4:
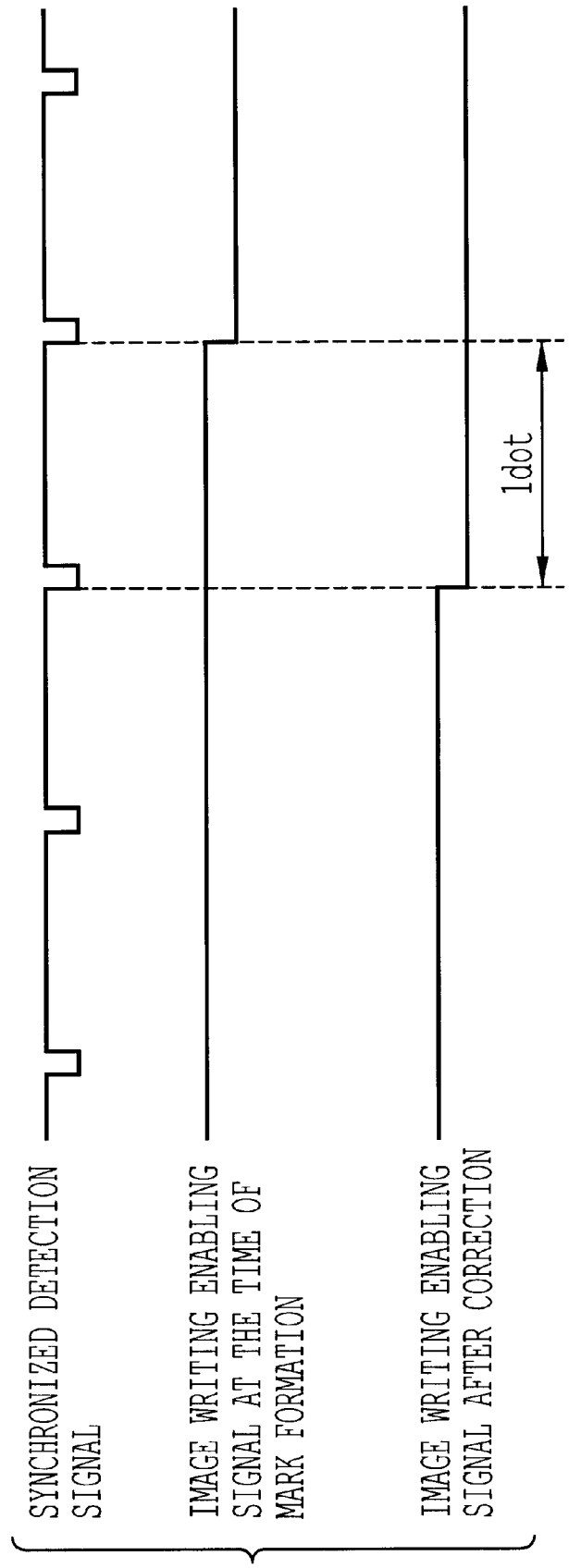
FIG. 4 is a time chart for each type of signal during the write timing correction in the sub-scanning direction.

The write timing correction in the sub-scanning direction is explained with reference to FIG. 4. FIG. 4 is a time chart for each type of signal during the write timing correction in the sub-scanning direction. In this case, the correction is one dot.

The image region signal in the sub-scanning direction or the write enable signal adjusts the writing along with the timing of the synchronized detection signal. As shown in FIG. 4, if based on the detection of the compensation patterns 14 it is decided that the position of writing has to be started one dot early, the writing enabling signal is advanced by one synchronized detection signal.

Figure 5:
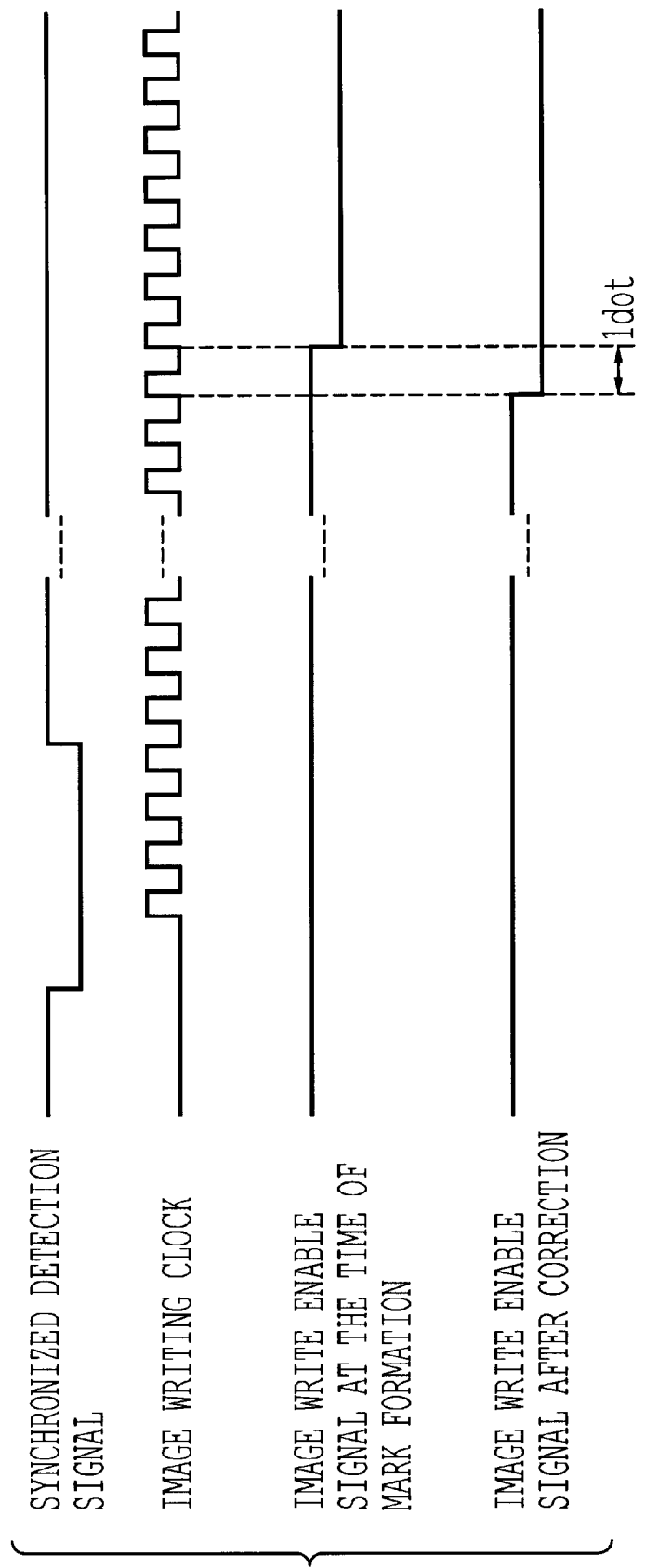
FIG. 5 is a time chart for each type of signal during the write timing correction in the main scanning direction.

The write timing correction in the main scanning direction is explained with reference to FIG. 5. FIG. 5 is a time chart for each type of signal during the write timing correction in the main scanning direction. In this case, the correction resolution is one dot. The clock signals of precisely-set phase can be obtained for the respective lines by the falling edge of the synchronized detection signal for the image write clock. The writing of the image is performed in synchronization with the clock signal. The image write enable signal in the main scanning direction is also obtained in synchronization with the clock signal. As a result of the compensation pattern detection and the calculation, if the position of writing one dot has to be obtained early, the write enable signal is advanced by one clock pulse.

The magnification correction in the main scanning direction is explained with reference to FIG. 5. When the magnification in the main scanning direction deviates from the standard color, the magnification of the main scanning direction can be altered by employing a device by which the frequency of the clock can be changed by a very small step, for example, a clock generator or the like. In this case, the magnification in the main scanning direction deviates from the standard color due to the calculation based on the detection of compensation patterns 14 by a color other than the standard color.

The skew deviation correction value, correction value for write timing in the sub-scanning direction, correction value for write timing in the main scanning direction, and magnification correction value in the main scanning direction are calculated as mentioned.

In the conventional technology which employs detection of the compensation patterns by the sensors 15 and 16, a complete correction of deviation (nil deviation) is not guaranteed. However, in the first embodiment, the sampling data is sequentially fed into the DSP 30 whereby the problem is solved as explained below. An example of the deviation not being nil is given next.

Figure 6:
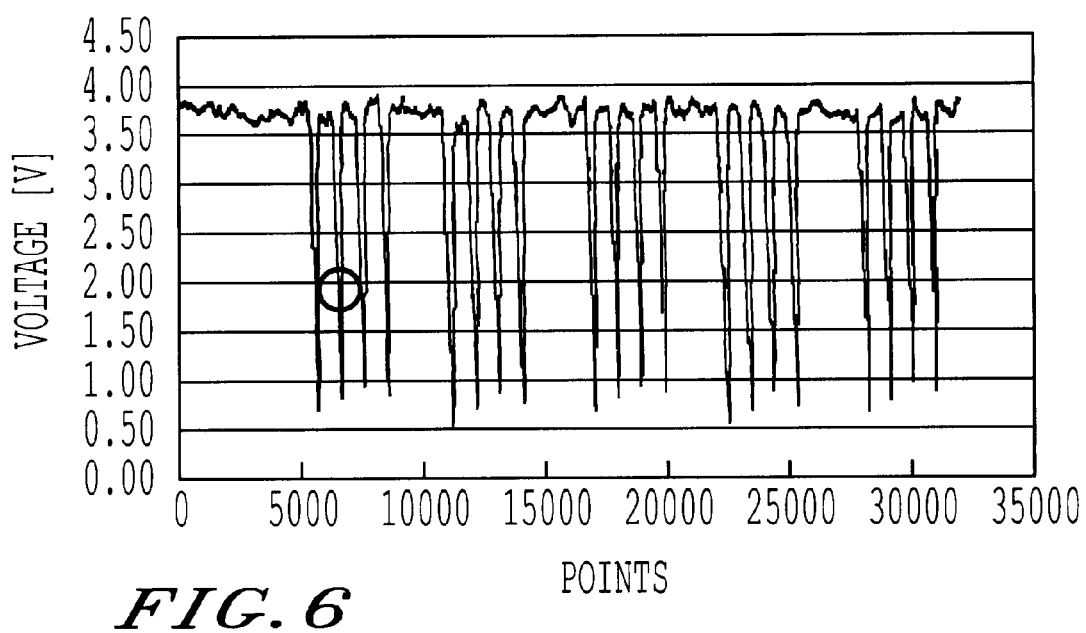
FIG. 6 is a graph showing the signal waveform when a compensation pattern is detected by the sensors.

FIG. 6 illustrates a graph showing the signal waveform when compensation patterns 14 are detected by the sensors 15 and 16. There appears a valley in the signal waveform wherever a compensation patterns 14 is detected, in contrast to flat portions that appear where there are no compensation patterns 14 on the surface of the conveyer belt 3. The analog signals in the form of valleys output from the sensors 15 and 16 are converted to a digital signal by the A/D converter 19. is the digital signals are then sampled at a frequency of 20 KHz by the sampling controller 20 and are treated as discrete data.

Figure 7:
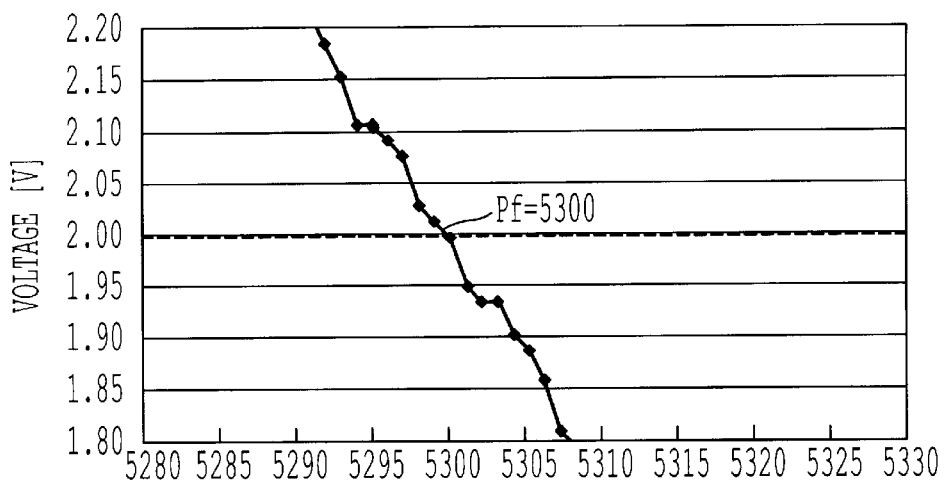
FIG. 7 is a graph showing a part of the falling edge of the signal waveform shown in FIG. 6.
Figure 8:
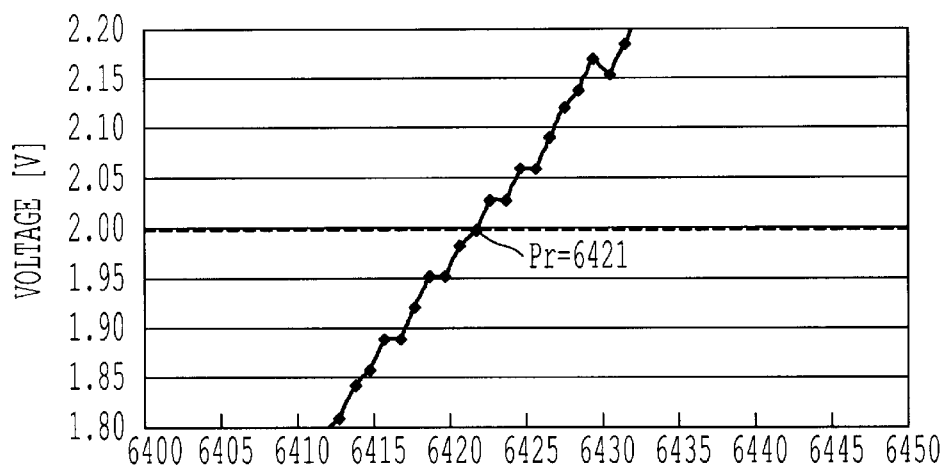
FIG. 8 is a graph showing a part of the rising edge of the signal waveform shown in FIG. 6.

The waveforms of the falling portion and the rising portion of the waveform at the point marked by a circle in FIG. 6 are illustrated in FIG. 7 and FIG. 8, respectively. When the waveform is cut off at a threshold level of 2.00 V as shown in FIG. 7, the point 5300 that is nearest to the threshold level of 2.00 V in the falling portion is taken as Pf. The point 6421 that is nearest to the threshold level of 2.00 V as shown in FIG. 8 is taken as Pr. If the center of the line being considered currently is Pc, then $$Pc=(Pf+Pr)/2=(5300+6421)/2=5860.5,$$

which may be rounded-off to 5861.

When the noise is superimposed in the waveform particularly close to the cutoff threshold level of 2.00 V, the positions of Pf and Pr cannot be determined accurately. Consequently, the determination of the center Pc is also affected. In other words, the position of each color cannot be accurately matched and hence the positional deviation cannot be exactly zero.

Figure 9:
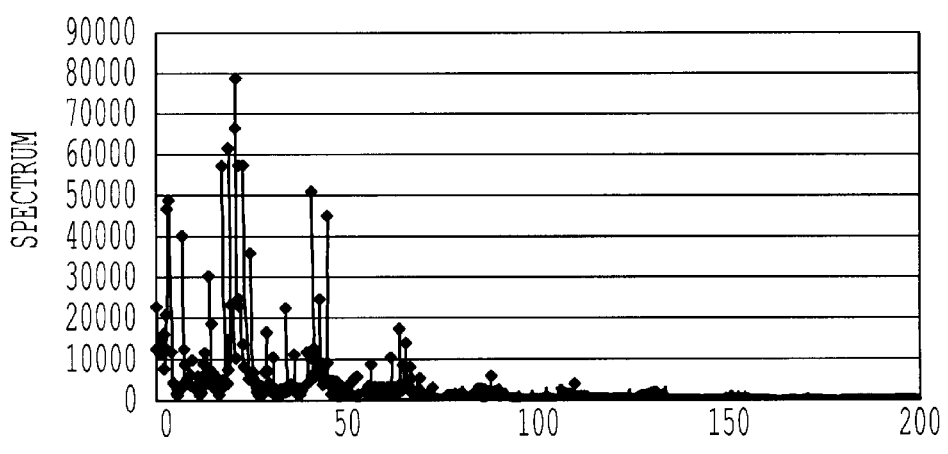
FIG. 9 is a graph showing a result of FFT analysis of frequency component of the detected waveform.

FIG. 9 is a graph that illustrates the result of frequency analysis, wherein the frequency of the detected waveform is analyzed by Fast Fourier Transform (FFT). As shown in FIG. 9, the frequency is distributed below 200 Hz and the frequency above this range is filtered out by the filter 18.

The filter 18 has a comparatively simple configuration that includes resistors, condensers and the like. If the filter is to perform steep attenuation, the configuration of the filter becomes complex and bulky. With this filter 18 having a simple configuration it is almost impossible to completely cut off at the frequency component (i.e. 200 Hz) that corresponds to the compensation patterns 14.

In the color image forming apparatus of the first embodiment, the sampled data is sequentially fed into the DSP 30. The DSP 30 enables fast filter calculation with steep attenuation in real time. The DSP 30 includes a not shown summation computing circuit. This summation computing circuit performs the high speed filtering process described in detail later.

Figure 10:
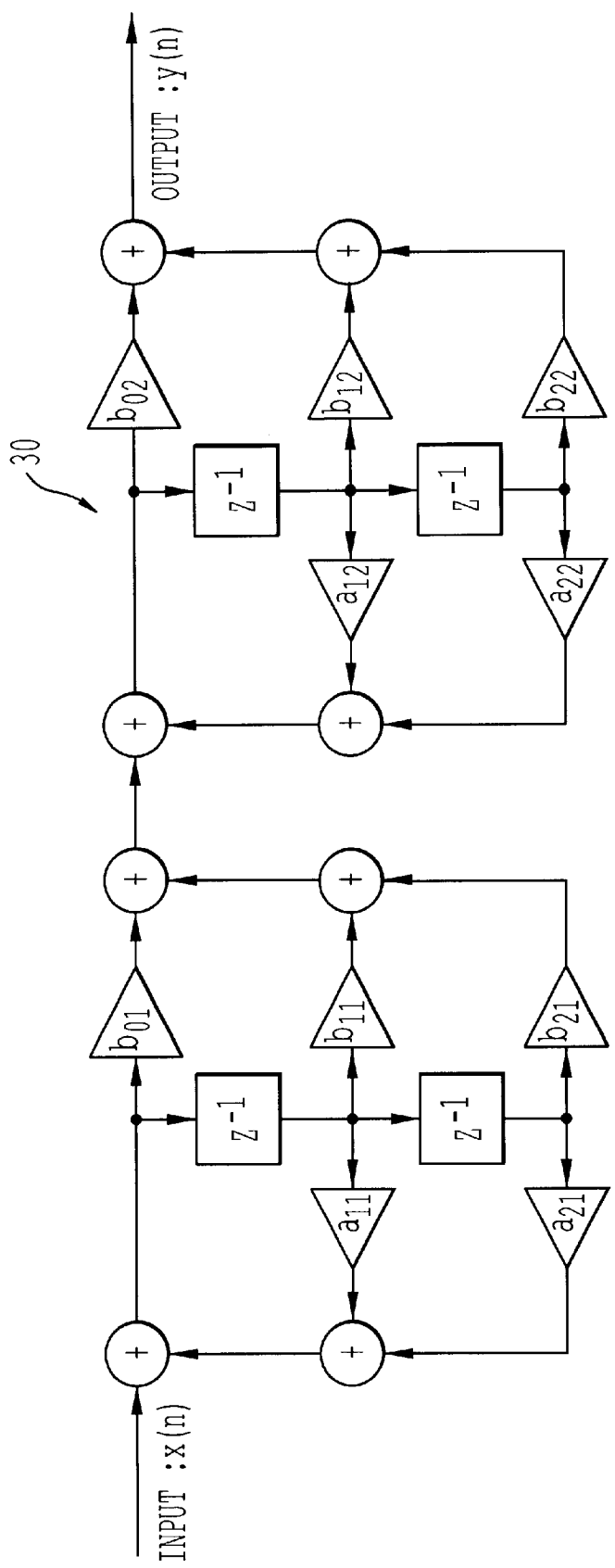
FIG. 10 is a block diagram of the filtering process algorithm executed in a DSP.

FIG. 10 is a block diagram of the filtering process algorithm executed in the DSP 30. The process illustrated in FIG. 10 is a Chebyshev Low Pass infinite impulse response (IIR) filtering process (IIR type digital filter). The specifications of this filtering process are as follows:

| Ripple rate: | 0.1 (dB), |
| Filtering degree: | 4 deg, |
| Sampling frequency: | 20 KHz, and |
| Cutoff frequency: | 200 (Hz). |

Since the structure and operation of Chebyshev Low Pass IIR filter well-known they will not be explained. When each coefficient shown in FIG. 10 is determined according to the mentioned specifications, their values will be:

$a_{11}$ = 1.92060454
$a_{21}$ = −0.92296914
$b_{01}$ = 0.00058775
$b_{11}$ = 0.00117551
$b_{21}$ = 0.00058775
$a_{12}$ = 1.96221694
$a_{22}$ = −0.96737867
$b_{02}$ = 0.00128303
$b_{12}$ = 0.00256605
$b_{22}$ = 0.00128303.

Figure 11:
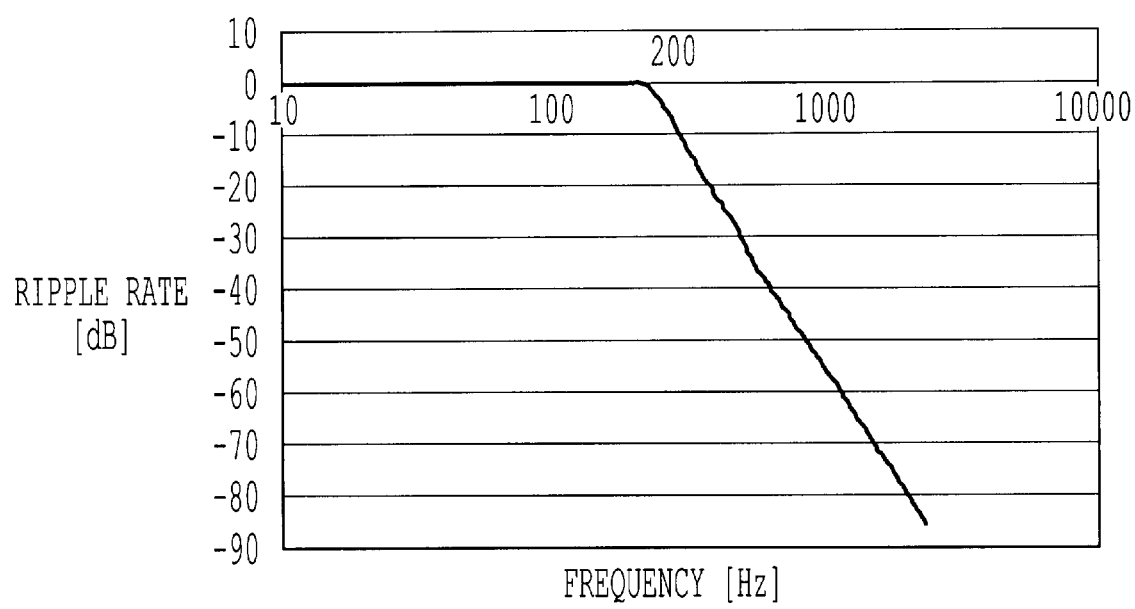
FIG. 11 is a graph showing frequency-amplitude characteristic of an IIR type digital filter.
Figure 12:
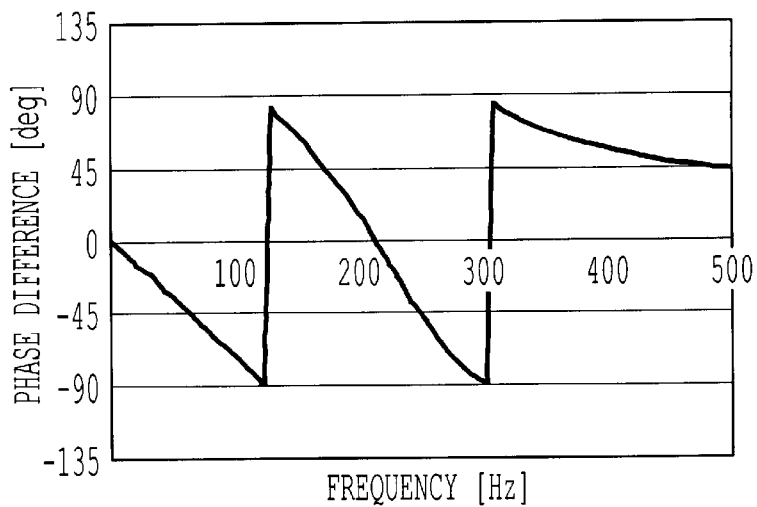
FIG. 12 is a graph showing frequency-phase characteristic of the IIR type digital filter.

The frequency-amplitude characteristics of the filter are illustrated in FIG. 11 and the frequency-phase characteristics are illustrated in FIG. 12.

Figure 13:
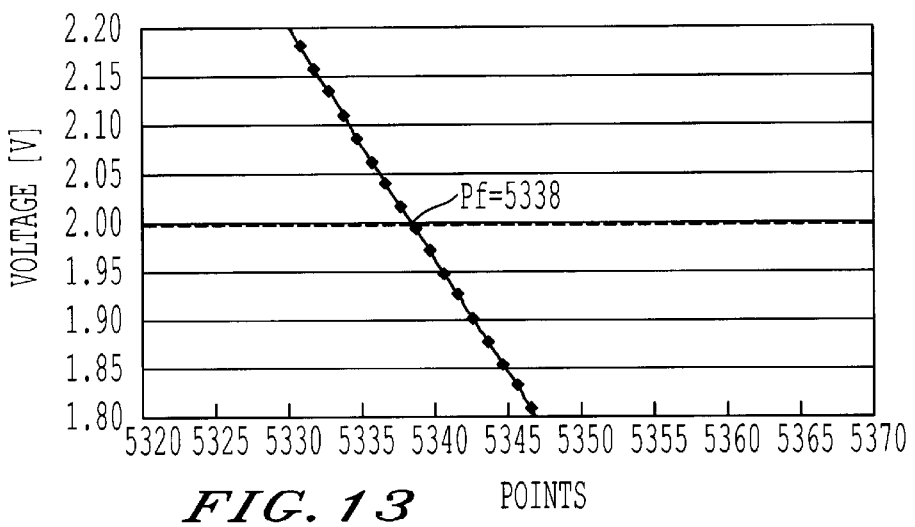
FIG. 13 is a graph showing a part of the falling edge of the signal waveform with reduced noise component accomplished using the IIR type digital filter.
Figure 14:
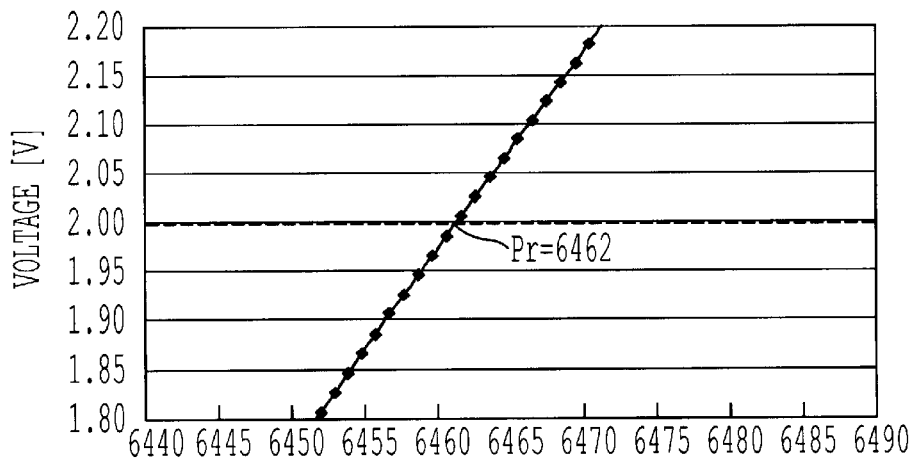
FIG. 14 is a graph showing a part of the rising edge of the signal waveform with reduced noise component accomplished using the IIR type digital filter.

FIG. 13 and FIG. 14 are graphs depicting the plotted output data y[n] after the input data x[n] is filtered. Since the waveforms are smooth, it means that there in no or little noise.

From FIG. 13, Pf=5338, and from FIG. 14, Pr=6462. Therefore, the center, Pc is $$Pc=(Pf+Pr2)/2=(5338+6462)/2=5900.$$

Thus, the filter according to the first embodiment effectively eliminates the noise effect seen near the threshold level and enables determination of a stable Pc. Consequently, the position of each color can be exactly matched, thereby eliminating the positional deviation of respective colors.

Thus, discrete data is obtained based on the output value from sensors 15 and 16 that detect the presence or absence of compensation patterns 14 formed on a conveyer belt 3. A filtering process filters out all the discrete data that exceed the frequency for the relevant compensation pattern. A correction value is added to the drive control of the driver based on the recognition result of the formed compensation patterns 14, eliminating the noise superimposed on the output value from the sensors 15 and 16. As a result, each color can be exactly matched when forming a color image on the transfer sheet 2.

A second embodiment of the present invention is explained with reference to FIG. 15. The parts that have same or similar configuration or parts that perform same or similar functions as those in the first embodiment are shown with the same reference symbols and numerals and their explanation is omitted. A different filtering process is employed in the second embodiment.

Figure 15:
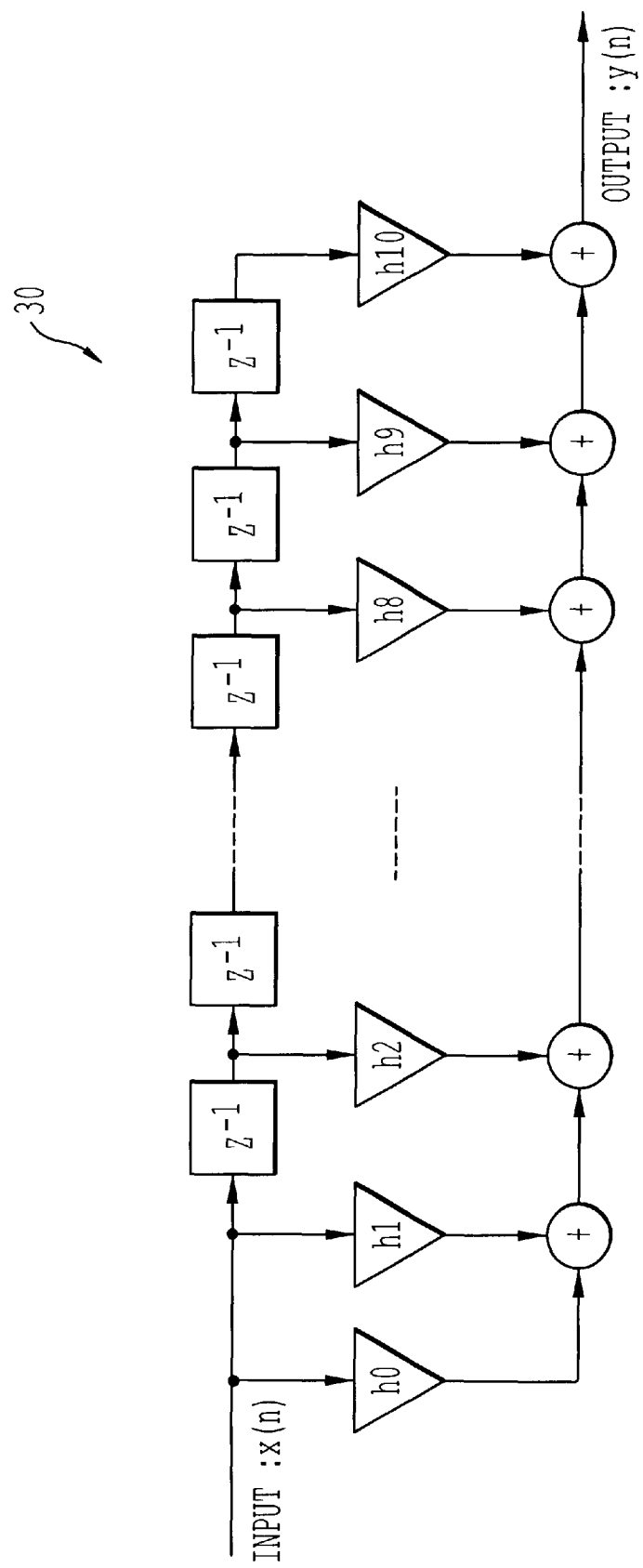
FIG. 15 is a block diagram illustrating a filtering algorithm used in the DSP according to a second embodiment of this invention.

FIG. 15 is a block diagram of the filtering process algorithm executed in the DSP 30 in the second embodiment. Filtering process shown in FIG. 15 is done by low-pass direct type finite impulse response (FIR) filter (FIR type digital filter). The specifications for this type of filter are as follows:

| | |
|---|---|
| Attenuation quantity: | 40 (dB), |
| Filter degree: | 10 deg, |
| Sampling frequency: | 20 (KHz), |
| Cutoff frequency: | 200 (Hz). |

Since the structure and operation of low-pass direct type FIR filter are well-known, they will not be explained. When each coefficient in FIG. 15 is determined according to the specifications given above, their values will be:

| |
|---|
| h0 = 0.02209747 |
| h1 = 0.05201203 |
| h2 = 0.08689633 |
| h3 = 0.11978504 |
| h4 = 0.14329547 |
| h5 = 0.15182734 |
| h6 = 0.14329547 |
| h7 = 0.11978504 |
| h8 = 0.08689633 |
| h9 = 0.05201203 |
| h10 = 0.02209747 |

The filtering process shown in FIG. 15 eliminates the noise and makes it possible to obtain a steady waveform, similar to those shown in FIG. 13 and FIG. 14.

Thus, the filter according to the second embodiment effectively eliminates the noise effect usually seen near the threshold level and enables determination of a stable Pc. Consequently, the position of each color can be exactly matched, thereby eliminating positional deviation of respective colors.

Thus, the filtering process eliminates all the frequencies that do not match the relevant compensation pattern 14. This facilitates accurate identification of positions where compensation patterns are formed.

A third embodiment of this invention is explained with reference to FIG. 16. A different filtering process is employed in the third embodiment.

Figure 16:
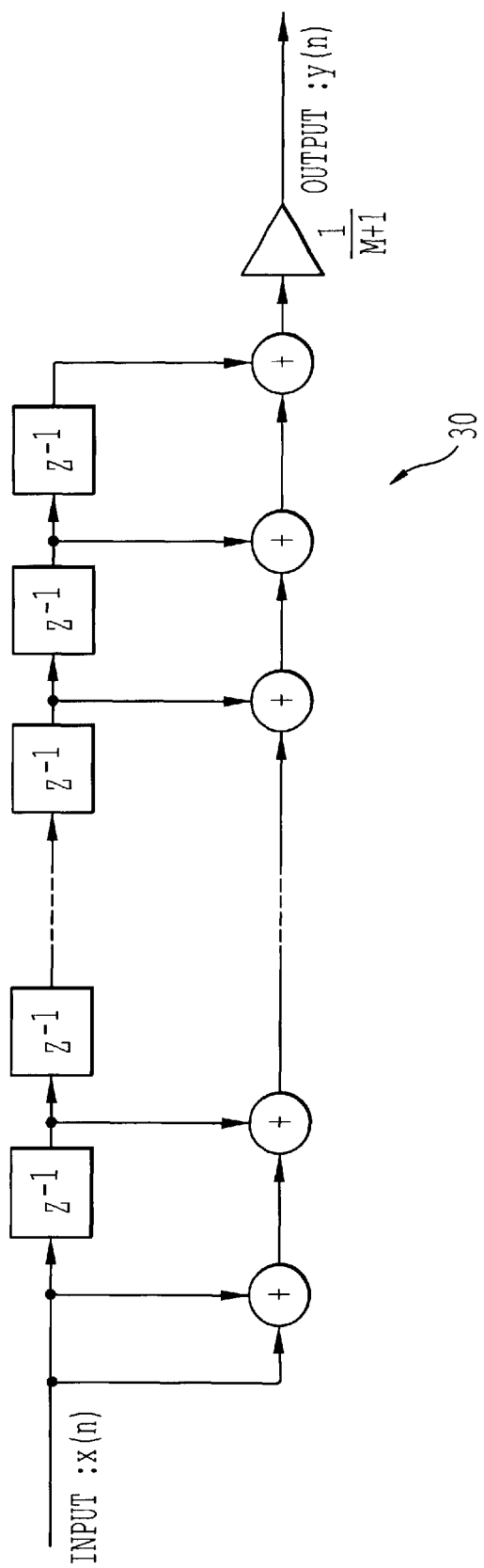
FIG. 16 is a block diagram illustrating a filtering algorithm used in the DSP according to a third embodiment of this invention.

FIG. 16 is a block diagram of the filtering process algorithm executed in the DSP 30 in the third embodiment. Here the filtering process is carried out by a moving-average type digital filter and the average number M is equal to 20. Since the structure and operation of moving-average type filter are well-known, they will not be explained.

The filtering process shown in FIG. 16 eliminates the noise and makes it possible to obtain a steady waveform, similar to that shown in FIG. 13 and FIG. 14.

Thus, the filter according to the third embodiment effectively eliminates the noise effect usually seen near the threshold level and enables determination of a stable Pc. Consequently, the position of each color can be exactly matched, thereby eliminating positional deviation of respective colors.

Thus, the filtering process eliminates all the frequencies that do not match the relevant compensation pattern 14. This facilitates accurate identification of positions where compensation patterns are formed.

According to the present invention, images of each color can be exactly matched when forming a color image. Moreover, filtering operation can be conducted speedily. Furthermore, since the infinite impulse response (IIR) type digital filter or the finite impulse response (FIR) type digital filter or the moving-average type digital filter is used for the filtering, the filtering can be performed accurately and so the positions of the compensation patterns can be calculated accurately.

The present document incorporates by reference the entire contents of Japanese priority document, 2001-288517 filed in Japan on Sep. 21, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color image forming apparatus comprising:
   a plurality of full-color image processing sections arranged along a conveyer belt, each of the image processing sections forming a toner image of a corresponding color on a recording medium in a superimposed fashion;
   a driver that drives the image processing sections;
   a compensation pattern forming unit that forms at least one compensation pattern on the conveyer belt;
   at least one sensor that detects the compensation pattern and outputs a signal when the compensation pattern is detected;
   a filter unit including,
      an analog filter configured to filter out some noise frequency components from the signal output by the sensor, the filtered some noise frequency components not corresponding to frequency components of the compensation pattern, and
      a digital filter configured to perform a fast digital filtering calculation with steep attenuation to provide a digital filtering function to remove any remaining noise frequency components not corresponding to the components of the compensation pattern not removed by the analogue filter;
   a compensation pattern position recognizer that recognizes the position of the compensation pattern on the conveyer belt based on the output of the filter unit;

a correction value calculator that calculates a correction value based on position of the compensation pattern recognized by the compensation pattern position recognizer; and a drive controller that controls the driver based on the correction value when forming a color image on the recording medium.

2. The color image forming apparatus according to claim 1, wherein the digital filter comprises a summation computing circuit that carries out the filtering calculation.

3. The color image forming apparatus according to claim 2, wherein the digital filter is an infinite impulse response type digital filter.

4. The color image forming apparatus according to claim 2, wherein the digital filter is a finite impulse response type digital filter.

5. The color image forming apparatus according to claim 2, wherein the digital filter is a moving-average type digital filter.

6. A color image forming apparatus comprising:

a plurality of full-color image processing means arranged along a conveying means, each of the image processing means forming a toner image of a corresponding color on a recording medium in a superimposed fashion;

a driving means for driving the image processing means;

a compensation pattern forming means for forming at least one compensation pattern on the conveying means;

at least one sensing means for detecting the compensation pattern and outputting a signal when the compensation pattern is detected;

a filtering means including,
an analog filter means for filtering out some noise frequency components from the signal output by the sensing means, the filtered some noise frequency components not corresponding to frequency components of the compensation pattern, and a digital filter means for performing a fast digital filtering calculation with steep attenuation to provide a digital filtering function to remove any remaining noise frequency components not corresponding to the components of the compensation pattern not removed by the analogue filter means a compensation pattern position recognizing means for recognizing the position of the compensation pattern of the conveying means based on the output of the filtering means;

a correction value calculating means for calculating a correction value based on the position of the compensation pattern recognized by the compensation pattern position recognizing means; and a drive controlling means for controlling the driving means based on the correction value when forming a color image on the recording medium.

7. The color image forming apparatus according to claim 6, wherein the digital filter means comprises a summation computing circuit that carries out the filtering calculation.

8. The color image forming apparatus according to claim 7, wherein the digital filter means is an infinite impulse response type digital filter means.

9. The color image forming apparatus according to claim 7, wherein the digital filter means is a finite impulse response type digital filter means.

10. The color image forming apparatus according to claim 7, wherein the digital filter means is a moving-average type digital filter means.

* * * * *